(12) United States Patent
Cheng

(10) Patent No.: US 9,648,029 B2
(45) Date of Patent: May 9, 2017

(54) SYSTEM AND METHOD OF ACTIVE REMEDIATION AND PASSIVE PROTECTION AGAINST CYBER ATTACKS

(71) Applicant: Newegg Inc., City of Industry, CA (US)

(72) Inventor: Lee C. Cheng, City of Industry, CA (US)

(73) Assignee: NEWEGG INC., City of Industry, CA (US)

( * ) Notice: Subject to any disclaimer, the term of this patent is extended or adjusted under 35 U.S.C. 154(b) by 0 days.

(21) Appl. No.: 13/953,790

(22) Filed: Jul. 30, 2013

(65) Prior Publication Data

US 2014/0033310 A1    Jan. 30, 2014

Related U.S. Application Data

(60) Provisional application No. 61/677,242, filed on Jul. 30, 2012.

(51) Int. Cl.
*H04L 29/06* (2006.01)

(52) U.S. Cl.
CPC ...... *H04L 63/1408* (2013.01); *H04L 63/1416* (2013.01)

(58) Field of Classification Search
CPC ........ G06F 21/60; G06F 21/577; G06F 21/55; H04L 63/1416; H04L 63/1408
USPC ................. 726/11–13, 22–30; 713/150, 156, 713/175–177
See application file for complete search history.

(56) References Cited

U.S. PATENT DOCUMENTS

| | | | | |
|---|---|---|---|---|
| 7,698,444 | B2* | 4/2010 | Sheymov et al. | 709/229 |
| 8,046,833 | B2* | 10/2011 | Gustafson et al. | 726/23 |
| 8,566,928 | B2* | 10/2013 | Dagon et al. | 726/22 |
| 2006/0294588 | A1* | 12/2006 | Lahann | H04L 63/1416 726/23 |
| 2007/0168532 | A1* | 7/2007 | Sheymov | G06F 21/55 709/229 |
| 2008/0148414 | A1* | 6/2008 | Tom | G06F 21/10 726/29 |
| 2008/0244741 | A1* | 10/2008 | Gustafson | H04L 63/20 726/23 |
| 2013/0333036 | A1* | 12/2013 | Lahann et al. | 726/23 |
| 2014/0013434 | A1* | 1/2014 | Ranum et al. | 726/24 |

* cited by examiner

*Primary Examiner* — Evans Desrosiers
*Assistant Examiner* — Quazi Farooqui
(74) *Attorney, Agent, or Firm* — The Webb Law Firm

(57) ABSTRACT

A system and method for active remediation and/or passive protection against cyber attacks includes an active remediation and passive protection server computer for monitoring at least a portion of network data between at least one first network and at least one second network to detect one or more attacks and/or unauthorized access to at least one first agent in the at least one first network by at least one second agent in the at least one second network. The active remediation and passive protection server computer executes at least one of (i) one or more active remediation mechanisms to actively respond to the one or more detected attacks and/or unauthorized access and (ii) one or more passive protection mechanisms to passively protect against the one or more detected attacks and/or unauthorized access.

15 Claims, 8 Drawing Sheets

SYSTEM AND METHOD OF ACTIVE REMEDIATION AND PASSIVE PROTECTION AGAINST CYBER ATTACKS

CROSS REFERENCE TO RELATED APPLICATIONS

This application is a nonprovisional application of U.S. Provisional Patent Application No. 61/677,242, filed Jul. 30, 2012, entitled "System and Method of Active Remediation and Passive Protection Against Cyber Attacks", and is hereby incorporated by reference in its entirety.

BACKGROUND OF THE INVENTION

Field of the Invention

The presently disclosed system and method relates to network system security, and in particular, relates to a system and method of active remediation and passive protection against cyber attacks.

Description of Related Art

Network resources or devices compromised by malicious software have become a modern pandemic. With the ever increasing complexity in software and heavy emphasis on feature driven development instead of security, the prevalence of software exploits have created whole industries dedicated to exploiting and commandeering network resources for personal and economic gain. As software become more complex, so has the sophistication of exploits, Trojans, viruses and/or malicious software created by hackers, malicious entities, businesses, or even government agencies (malware developers).

Moreover, with practically almost every network capable computer, resource, or device connected to the internet, malware developers have found new ways to utilize the interdependence of networked computers, resources, or devices to aggregate their network capacity and computing power into a botnet, or a network of compromised resources or devices each individually known as a robot or bot and each executing malicious software that are under the control of one or more entity for a variety of purposes. These botnets can then be remotely controlled for purposes such as, for example, Distributed Denial of Service (DDoS) attacks and/or rental services relating to DDoS attacks, distributed decryption of stolen encrypted data, bitcoin mining, email spamming, and/or web crawling.

To combat against botnets and/or malicious software installed on network resources or devices, antivirus and/or antimalware software are generally installed on such resources or devices. However, in many cases, antivirus and/or antimalware may not be sufficient, especially when Trojan, virus, and/or malware scans are not executed on a regular basis due to potential downtime it may cause, or the entity in possession and/or control of the network resource or device may not be aware of the infection on their resources or devices because the current version of the antivirus or antimalware is incapable of detecting this type of malicious software. Additionally, while intrusion detection/prevention systems and firewalls may offer only limited protection against attacks already in progress, it is simply incapable of stopping or preventing attacks at its source. Without the ability to prevent recurring attacks, or alert authorities or persons or entities in possession or control of the commandeered resource or device, these commandeered resources or devices may be used repeatedly to attack its target or infect new network resources or devices. Accordingly, an improved system and method is needed.

SUMMARY OF THE INVENTION

The present disclosure relates to a system and method to prevent, remediate, and deter multi-agent cyber attacks through a responsive transmission to all possible initiating or controlled agent machines because the best defense is a good (and legally compliant) offense.

The present disclosure also relates to a system and method for detecting unauthorized access by an agent, preventing unauthorized access by the agent, and/or notifying an owner, an agent operated by the owner, and/or an entity in lawful possession or control of proprietary data regarding the unauthorized access.

According to a preferred embodiment, a method for active remediation and/or passive protection against cyber attacks comprises monitoring, by an active remediation and passive protection server computer, at least a portion of network data between at least one first network and at least one second network to detect one or more attacks and/or unauthorized access to at least one first agent in the at least one first network by at least one second agent in the at least one second network. The active remediation and passive protection server computer executes at least one of (i) one or more active remediation mechanisms to actively respond to the one or more detected attacks and/or unauthorized access and (ii) one or more passive protection mechanisms to passively protect against the one or more detected attacks and/or unauthorized access.

According to another preferred embodiment, a system for active remediation and/or passive protection against cyber attacks comprises an active remediation and passive protection server computer between at least one first network and at least one second network. The active remediation and passive protection server computer is configured to monitor at least a portion of network data between the at least one first network and the at least one second network to detect one or more attacks and/or unauthorized access to at least one first agent in the at least one first network by at least one second agent in the at least one second network. The active remediation and passive protection server computer is configured to execute at least one of (i) one or more active remediation mechanisms to actively respond to the one or more detected attacks and/or unauthorized access and (ii) one or more passive protection mechanisms to passively protect against the one or more detected attacks and/or unauthorized access.

Functions of the presently disclosed system and method include, but are not limited to, the protection of critical infrastructures such as, for example, Domain Name Servers, Web Servers, Source Code and/or Version Control Servers, Database Servers and the like. Additionally, functions of the presently disclosed system and method also include protection against theft of confidential and/or proprietary information, theft of intellectual property, protection against web crawlers and screen scrapers, protection against hacks and/or breaches.

DETAILED DESCRIPTION OF THE INVENTION

Figure 1:
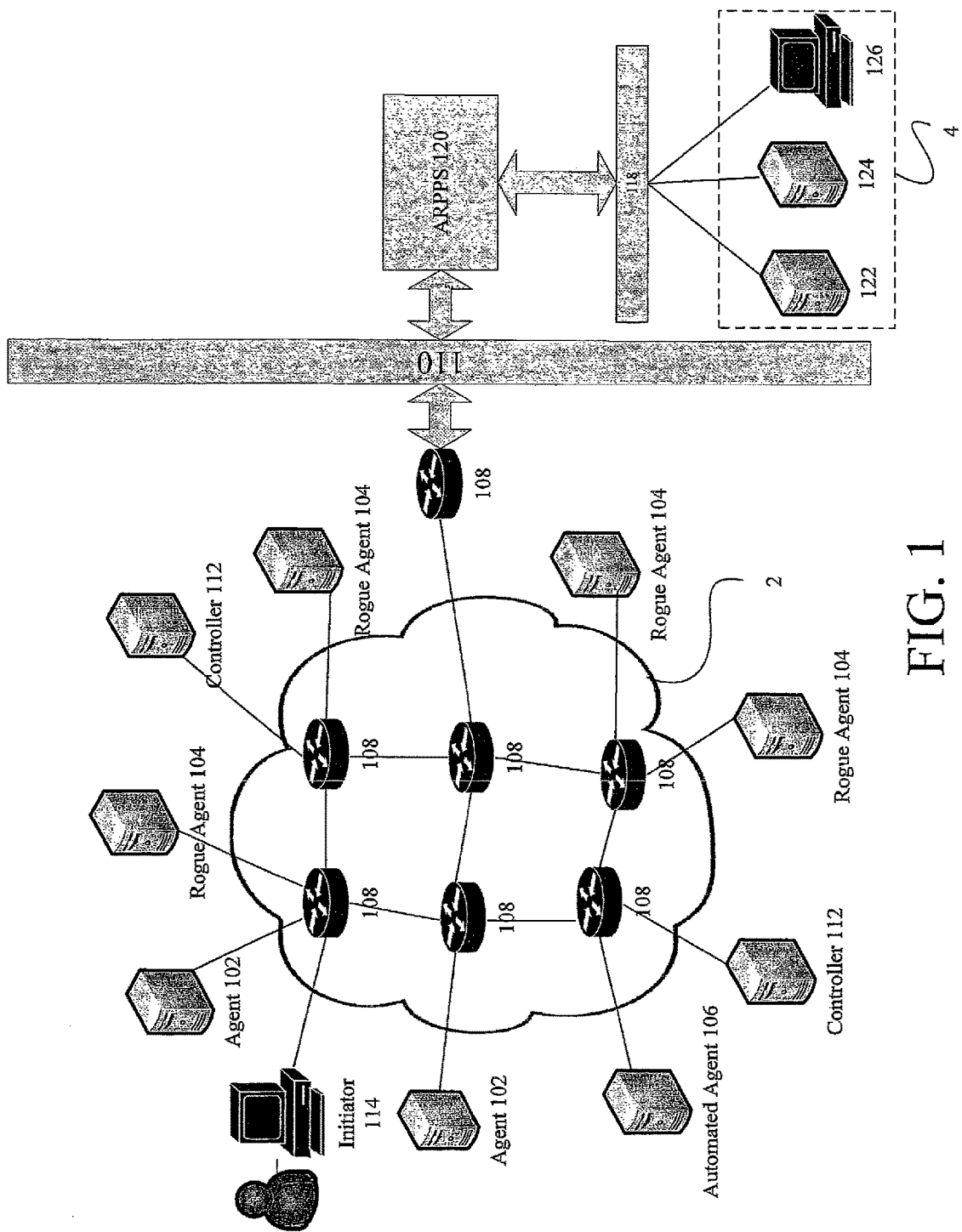
FIG. 1 illustrates an exemplary embodiment of an active and/or passive remediation system placed in a network.

Numerous specific details are set forth to provide a thorough understanding of the embodiments. It will be understood by those skilled in the art, however, that the embodiments may be practiced without these specific details. In other instances, well-known operations, components, and/or circuits have not been described in detail so as not to obscure the embodiments. It can be appreciated that the specific structural and functional details disclosed herein may be representative and do not necessarily limit the scope of the embodiments.

Unless specifically stated otherwise, references throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Unless specifically stated otherwise, references throughout the specification to "network data" mean information that is encoded and organized in a computer readable format and transmitted between one or more resources or devices via one or more networks.

Unless specifically stated otherwise, references throughout the specification to "agents" mean physical network devices, such as switches, routers, hubs, modems, network hosts or any other physical network device that can interconnect and/or provide services for one or more network devices. Alternatively, the agents can also be virtual devices. Virtual network devices may include, but are not limited to, servers, gateways, proxies, virtual appliances, or any other services, daemons or processes executing on one or more physical network devices and/or one or more virtual machines.

Unless specifically stated otherwise, references throughout the specification to "protected agent" means an agent that is used in the course of business, including, but not limited to, web servers, transaction servers, database servers, Voice Over IP servers, and clients.

Unless specifically stated otherwise, references throughout the specification to "Rogue Agent" means an agent that has been compromised by malware, viruses, Trojans or any other unauthorized and/or unintended executable or interpretable code in physical or virtual network devices. Moreover, the Rogue Agents may contain unauthorized/unintended executable code and may execute the unauthorized/unintended executable code. The unauthorized and/or unintended executable code can be implemented in processes, daemons, dynamic libraries, or scripts, on the Rogue Agent. It can be appreciated that the Rogue Agent can also be configured to open one or more network connections to perform various attacks or unauthorized access. Additionally, it can also be appreciated that the Rogue Agent can be configured to open one or more network connections to connect to other Rogue Agents in a peer-to-peer network or to one or more controllers in a centralized network. Further, the Rogue Agent can also be configured to scrape or crawl, one or more resources to automatically retrieve data, including public and/or confidential data, from the one or more resources or agents.

Unless specifically stated otherwise, references throughout the specification to "Automated Agent" means an agent configured by an entity in possession and/or control of the Automated Agent to access protected agents in an undesirable manner, such as, for example, access to, web scrapers, web crawlers, and screen scrapers or any other automated executable code for retrieving data, including public and/or confidential data from a resource. The Automated Agent can be configured to scrape or crawl, one or more resources or agents to automatically retrieve data from those resources or agents. Additionally, while a Rogue Agent can also be configured to perform similar functionality of Automated Agents, the Automated Agents are generally installed on agents under the possession and/or control of an entity that approves such practices and/or derives some benefit from the use of web scraping or crawling, or otherwise hacking the one or more resources or agents for purposes of obtaining public data and/or confidential data.

Unless specifically stated otherwise, references throughout the specification to "controller" means an agent configured to establish one or more connections with Rogue Agents and/or Automated Agents for the purposes of commanding and controlling one or more Rogue Agents or one or more Automated Agents in a centralized network. The controller can also be configured to establish one or more connections with other controllers to create a larger centralized network. Such configuration can be accomplished by malware, viruses, Trojans or any other unauthorized and/or unintended executable or interpretable code implemented in processes, daemons, dynamic libraries, or scripts, on the controller. Alternatively, an entity in possession and/or control can configure the controller to establish one or more connections with Automated Agents for controlling and directing the one or more Automated Agents to perform web scraping, web crawling, and screen scraping or any other automated executable code for retrieving data from a protected agent in an undesired or unauthorized manner.

Unless specifically stated otherwise, references throughout the specification to "Initiators" means a hacker, a malicious person or entity, an unauthorized person or entity, or any person or entity who initiates or begins an attack or unauthorized access by connecting to and sending one or more commands to one or more Rogue Agents, one or more controllers, or one or more Automated Agents.

FIG. 1 illustrates an exemplary embodiment of the active remediation and passive protection system (ARPPS) 120 connected in-lines between the Internet 2 and an Intranet 4 or any other internal network or combination thereof via one or more network devices such as, for example, switch 118. It can be appreciated that the ARPPS 120 can be communicatively coupled to the Internet 2 and/or an Intranet 4 or any other internal network via a hub port, a switch spanning port, or a network tap where network data may be monitored by the ARPPS 120. In such configurations, the ARPPS 120 may be communicatively coupled to the Internet 2 and/or Intranet 4 through intermediate systems actively and/or passively coupling the Intranet 4 to the Internet 2. In one implementation of the exemplary embodiment, the ARPPS 120 may be coupled to the Internet 2 behind the Firewall 110 or any other software, hardware, and/or firmware based mechanism for filtering network data and/or performing network address translation. Depending on the configuration of Firewall 110 and/or ARPPS 120, the ARPPS 120 may monitor some or all network data between the Internet 2 and the Intranet 4. The ARPPS 120 may be configured to detect and remediate against attacks or unauthorized/undesired access to one or more Protected Agents 122-126 such as, for example, hardware or software critical to business functionality which may include, but are not limited to, web servers, transaction servers, database servers, source code control systems (SCCS). The ARPPS 120 can be configured to determine the source of the detected attack and/or unauthorized/undesired access to one or more protected agents. After the ARPPS 120 detects an attack, unauthorized, or undesired access to protected agents, the ARPPS 120 can be configured to passively protect against further attacks. Alternatively, if the ARPPS 120 is configured to actively protect against further attack, unauthorized, undesired access, the ARPPS 120 may determine the source of attack, and actively remediate against the attack by performing a number of advanced protection and notification steps.

With continued reference to FIG. 1, in an example network, the network may contain one or more Agents 102, one or more Rogue Agents 104, one or more Automated Agents 106, one or more Controllers 112, and one or more Initiators 114. The Internet 2 can communicatively couple one or more Agents 102 through one or more network devices, such as, for example, Routers 108. The Agents 102 may be one or more agents communicatively coupled to other Agents 102, Rogue Agents 104, Automated Agents 106, Controllers 112, or Initiators 114 via the Internet 2. The Rogue Agents 104 may be one or more Rogue Agents communicatively coupled to Agents 102, other Rogue Agents 104, Automated Agents 106, Controllers 112, or Initiators 114 via the Internet 2. The Automated Agents 106 may be one or more Automated Agents communicatively coupled to Agents 102, Rogue Agents 104, other Automated Agents 106, Controllers 112, or Initiators 114 via the Internet 2. The Controllers 112 may be one or more controllers communicatively coupled to Agents 102, Rogue Agents 104, Automated Agents 106, other Controllers 112, or Initiators 114 via the Internet 2. The Initiators 114 may be an Initiators communicatively coupled to Agents 102, Rogue Agents 104, Automated Agents 106, or Controllers 112 via the Internet 2.

With continuing reference to FIG. 1, the one or more Rogue Agents 104 may be communicatively coupled to other Rogue Agents 104, Agents 102, Automated Agents 106, Controllers 112, and/or Initiators 114 utilizing one or more network protocols in a decentralized or a centralized manner. When the Rogue Agents 104 are connected in a decentralized manner such as, for example, in a peer-to-peer model, some or all of the Rogue Agents 104 may be initially configured in an idle state and waiting for one or more commands from other Rogue Agents 104 and/or Initiators 114. In a non-limiting example, when an Initiators 114 transmits a command to a Rogue Agent 104, the Rogue Agent 104 may stop idling and begin executing the command to notify all other Rogue Agents 104. The Agents 102 can be controlled to execute the command in a substantially synchronized fashion such as, for example, at a specific time.

If Rogue Agents 104 are interconnected in a centralized manner, such as, for example, in a client-server model, Controllers 112 may be designated as the command and control agents (i.e., the server in the client-server model) and may be connected to a plurality of other Rogue Agents 104 (i.e., the client in the client-server model). The Controllers 112 may be initially configured to be in an idle state waiting for one or more commands either from an Initiators 114 or directly input at the Controllers 112. Similarly, the other Rogue Agents 104 connected to the Controllers 112 may also be initially in an idle state waiting for one or more commands from the Controllers 112. When the Controllers 112, receives a command from the Initiators 114, the Controllers 112 may execute the one or more commands received from the Initiators 114 and may send one or more commands, to some or all Rogue Agents 104 for execution in a substantially synchronized manner. It can be appreciated that at least one Rogue Agent 104 can be configured to perform attacks or unauthorized access.

Similarly, the one or more Automated Agents 106 may be communicatively coupled to other Automated Agents 106, Agents 102, Rogue Agents 104, Controllers 112, and/or Initiators 114 utilizing one or more network protocols in a decentralized or a centralized manner similar to Rogue Agents 104. Thus, when Automated Agents 106 are connected in a centralized manner, such as, for example, in a client-server model, the Automated Agents 106 (i.e., the clients) may also be initially in an idle state waiting for one or more commands from a Controller 112 (i.e., the server). Alternatively, when the Automated Agents 106 are connected in a decentralized manner such as, for example, in a peer-to-peer model, some or all of the Automated Agents 106 may be initially in an idle state and waiting for one or more commands from other Automated Agents 106 and/or an Initiators 114. It can be appreciated that communications between and among Agents 102, Rogue Agents 104, Automated Agents 106, and/or Controller 112 may be encrypted and/or obfuscated. In addition, it can be appreciated that communications between and among Agents 102, Rogue Agents 104, Automated Agents 106, and/or Controller 112 may be accomplished via one or more applicable API's on public networks such as, for example, Twitter, Facebook, Internet Relay Chat (IRC), or encrypted, private, or anonymous networks such as, for example, through the use of The Onion Router (TOR).

FIG. 2 illustrates a non-limiting exemplary embodiment of Rogue Agents 202-210 communicatively coupled via the Internet 2. Moreover, in FIG. 2 the Rogue Agents 202-210 are communicatively coupled in a peer-to-peer model and configured to attack Protected Agents 220-224 communicatively coupled via the Intranet 4 in a substantially synchronized fashion. Once an Initiators 114 initiates an attack or unauthorized access on the ARPPS 120 by, for example, sending one or more commands to Rogue Agent 202, the command may propagate to one or more Rogue Agents 204-210, and the Rogue Agents 202-210 may attack Protected Agent 220 in a substantially synchronized fashion. ARPPS 120 may be configured to detect an attack by Rogue Agents 202-210. In one non-limiting exemplary embodiment of FIG. 2, in response to one or more commands from an Initiators 114, the Rogue Agents 104 may send one or more messages, such as a Transmission Control Protocol (TCP), Transmission Control Protocol Synchronize Messages (TCP SYN) to an agent 220 protected by the ARPPS 120. The message, when operated normally may be a legitimate attempt to connect services, such as, website services hosted by Protected Agent 220. However, when sent from Rogue Agents 202-210, these messages may not complete the TCP three-way handshake to initiate a legitimate connection. Moreover, the Rogue Agents 104 may not initiate a legitimate connection with Agents protected by ARPPS 120 (e.g., Protected Agents 220-224), by choosing not to send any response to the Protected Agent 220 and continuously and/or repeatedly send messages to the Protected Agent 220.

Alternatively, the source addresses in the IP headers of the messages may be spoofed, i.e., modified with a non-existent location by the Rogue Agents 202-210, which may cause the Protected Agent 220 to respond with acknowledgement messages to non-existent destinations. Because the Protected Agent 220, in preparation of establishing a legitimate connection, may be configured to allocate memory and/or other resources in receipt of each message from Rogue Agents 202-210, the agent's memory and/or other resources may be quickly exhausted by numerous Rogue Agents 104 initiating connections but never connect in a short time period which may impede legitimate connections. This is otherwise known as a flood attack, and the ARPPS 120 can be configured to detect these messages used in denial of service flood attacks.

It can be appreciated that the ARPPS 120 can also be configured to detect other types attacks including, but not limited to, Ping flood attacks, User Datagram Protocol (UDP) flood attacks, Internet Control Message Protocol (ICMP) flood attacks, smurf attacks, teardrop attacks, application layer attacks, slowloris attacks, or any other type of attacks that would reduce or inhibit the intended functionality of the Protected Agents 220-224. Further, while the exemplary embodiment illustrates ARPPS 120 detecting an attack from Rogue Agents 202-210 communicatively coupled in a decentralized peer-to-peer model, it can be appreciated that ARPPS 120 may also detect attacks from Rogue Agents 202-210 communicatively coupled in a centralized client-server model with one or more controllers (not shown) communicatively coupled to the Rogue Agents 202-210 (not shown). In addition, it can be appreciated that the ARPPS 120 can also be configured to detect unauthorized access from Automated Agents communicatively coupled either in a decentralized peer-to-peer model or centralized client-server model with one or more controllers (not shown).

To detect attacks and/or unauthorized access, the ARPPS 120 may utilize signature based detection, probabilistic based detection and/or state based detection to detect an attack or an unauthorized access. In one non-limiting exemplary implementation, and with continuing reference to FIG. 2A, the ARPPS 120 can be programmed for a signature based detection system and may track the number of TCP SYN messages received and stored from Rogue Agents 202-210 in one or more buffers, but do not establish a connection. In a non-limiting exemplary implementation, the ARPPS 120 can be configured to receive and store messages sent from Rogue Agents 202-210 with destination set for Protected Agents 220-224. Moreover, the ARPPS 120 can be further configured to determine if the number of TCP SYN messages received and stored in a buffer without an associated connection from Rogue Agents 202-210 exceed a threshold value or range within a specific period of time. If the number of TCP SYN messages exceeds the threshold value or range within the specified time period, then the ARPPS 120 signature based detection system may conclude that a SYN flood attack is occurring and begin storing the buffered TCP SYN messages in an attack database.

It will be appreciated that ARPPS 120 can also be configured to detect unauthorized access. Moreover, in one non-limiting exemplary implementation, the ARPPS 120 can be configured to determine if access of data or services provided by a protected agent such as, for example, Protected Agent 220 is a human user, or automated or Rogue Agents configured to read and store information in an unauthorized manner, such as, for example, by a price or web crawler. In one non-limiting exemplary implementation, the ARPPS 120 can be configured to use statistical based methods to analyze access patterns of agents to determine whether the agent requesting the information provided by Protected Agent 220 is an Automated Agent or Rogue Agent.

Moreover, the ARPPS 120 can be configured to store and compare access times, access frequency, and/or time spent accessing data or information from at least one service provided by the Protected Agent 220. If an agent accesses data or service provided by the Protected Agent 220, at a particular time(s) (e.g., 2 am until 6 am every day), and with a substantially regular frequency (e.g., every 30 minutes), accesses the data or service for a relatively short time period (e.g., five seconds or less), and directly accessing or deep linking a relatively large number of internal data or services directly without navigating or searching for the internal data or services, then the ARPPS 120 may conclude that the agent is an Automated Agent or a Rogue Agent configured for purposes of web or price crawling. The ARPPS 120 can be configured to set one or more signals or alerts and/or send one or more messages to the Protected Agent 220.

Figure 2A:
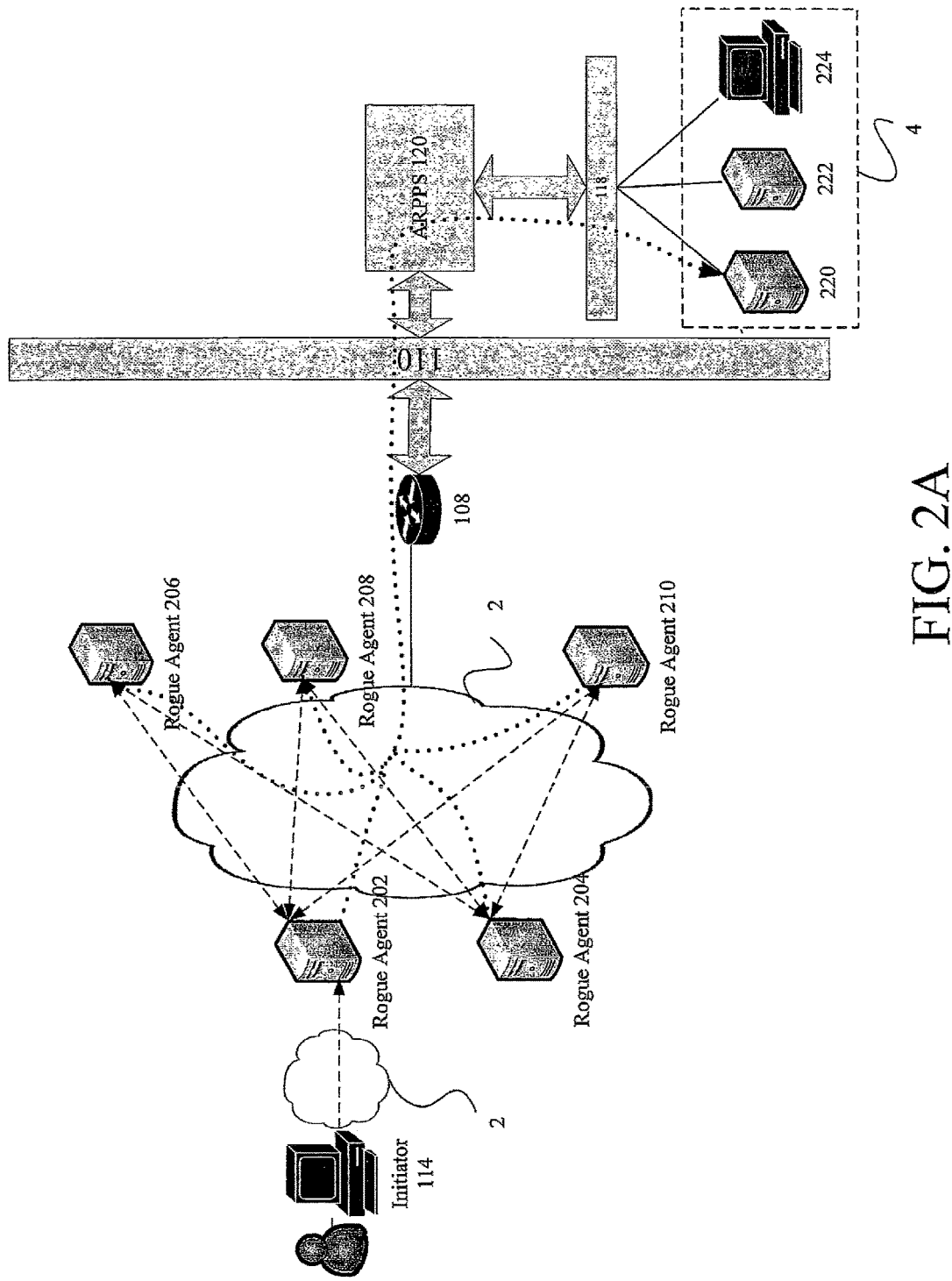
FIG. 2A illustrates an exemplary embodiment of an agent network attacking protected agents.

With continuing reference to FIG. 2A, the ARPPS 120 can also track access of public and/or confidential data of internal data or services such as, for example, Protected Agents 220-224. Moreover, ARPPS 120 may contain a list of approved agents that can access specific data or services using specific communication protocols, such, as for example, File Transfer Protocol, Secure File Transfer Protocol, Secure Shell (SSH), or third party services at designated ports such as, for example, Subversion Source Control (SVN), MySQL database, and the like. Thus, the ARPPS 120 can determine that access to these services or the use of these protocols is from a Rogue Agent or an Automated Agent, such as, for example, Rogue Agents 202-210, because the Rogue Agent or Automated Agent is not contained on the approved list, or they are not using the appropriate protocol or services.

Once ARPPS 120 detects an attack or unauthorized access, the ARPPS 120 can execute or perform active remediation and/or passive protection based at least partially on user selection. Active remediation include sending one or more payloads to remove malware or virus infections on the identified source(s), or sending one or more notification messages to one or more enforcement agencies, the entity responsible for the attack and/or the rogue or Automated Agent. Passive protection may include one blocking, throttling, interrupting attack and/or unauthorized access, or performing or executing any of the one or more types of passive protection or counter measures, and/or sending one or more alerts to the protected agents.

In one non-limiting exemplary implementation, ARPPS 120 can also be configured to determine the appropriate type of passive protection based on the detected type of attack or unauthorized access and select the type appropriate type of passive protection or countermeasures from a passive protection database to execute and remediate against attacks.

Moreover, the passive protection database may contain a list of attacks and at least one appropriate passive protection for each attack. In one non-limiting exemplary implementation, if the ARPPS 120 detects an unauthorized access from a web crawler or screen scraper, the ARPPS 120 can access the passive protect database, and select the appropriate type of passive protection or counter measure to execute. Thus, in the case screen scrapers or web crawlers on Protected Agent 220, the ARPPS 120 can be configured to block or interrupt access to Protected Agent 220 by suspected Automated Agents and/or Rogue Agents screen scraping or web crawling and send a challenge response test to the suspected Automated Agents and/or Rogue Agents before allowing access to the Protected Agent 220. It will be appreciated that the challenge response test can be configured to require an object identification in an image, text identification such as those presented in a Completely Automated Public Turing Test to tell Computers and Humans Apart (CAPTCHA), or a voice prompt requiring input of spoken words by a person to ensure that the access to Protected Agents 220 are generated by persons and not by suspected Automated Agents or Rogue Agents Optionally, it will also be appreciated that if the ARPPS 120 detects unauthorized access to data, the ARPPS 120 may first block or interrupt access to the requested data, replace the requested data, which may be confidential and/or proprietary, with non-proprietary, non-confidential, public data having the same data type as the requested data but with a Protection Module embedded or injected therein, such that the unauthorized access of data may be prevented and an evidentiary trail may be created. Alternatively, ARPPS 120 can also be configured to send existing confidential and/or proprietary data having the Protected Module embedded or injected therein, to further create an evidentiary trail for enabling or enhancing the prosecution of the unauthorized access of confidential and/or proprietary information. It will be appreciated that the confidential and/or proprietary data can be sent in encrypted and/or obfuscated form.

Moreover, based on the type of the proprietary data and its associated application(s), a Protection Module may be embedded into the confidential and/or proprietary data (Protected Data), such that when the associated application accesses the Protected Data, the Protection Module may also be executed or interpreted. The protection may be implemented by using macros in the associated application(s), scripting languages in the associated application(s), or any other interpreted and/or executable code or instructions supported by the associated application(s) for the proprietary data type (Protected Data Type).

In a non-limiting exemplary embodiment, the Protection Module may also be injected in one or more locations in the Protected Data, to exploit one or more vulnerabilities of the associated application(s) that allow remote execution of the Protection Module. These vulnerabilities may be determined by automated fuzz testing of the application(s) and its associated data type to determine the existence of remote execution vulnerabilities, such as, for example, buffer overruns, and determine the location(s) to inject executable code and/or instructions, such that when the application(s) accesses the Protected Data, the application also interprets and/or executes, or causes the Protection Module to be interpreted and/or executed. Thus, upon access of the Protected Data by the associated application(s), the Protection Module will be interpreted and/or executed by an agent accessing the Protected Data via the application(s).

To prevent unauthorized access of the Protected Data, the Protection Module can be configured to perform automated authentication by determining whether the agent accessing the Protected Data is an authorized agent, authorized owner, and/or entity in lawful possession or control of the Protected Data. Moreover, the Protection Module can retrieve identification data on the agent before enabling access to the Protected Data and analyze the identification data to obtain an agent signature. Additionally, it will be appreciated that the Protection Module may also store, save, and/or update the retrieved identification data, at a hidden location on an agent, with the Protected Data, and/or on a designated agent, such as, for example, a licensing or authorization agent or ARPPS 120. The identification data may include, but is not limited to, software identifiers, such as, for example, the type of application accessing the Protected Data, the version number(s) of the application accessing the Protected Data, operating system type, hardware identifiers such as Media Access Control (MAC) address for any network interfaces, storage serial numbers, processor serial numbers, Trusted Platform Module (TPM) remote attestation hash-key, personal identifiers, such as, for example, the current user logged into the agent, and/or metadata of the Protected Data, including, the users accessing the Protected Data, the number of times each have accessed, the length of time of access of the Protected Data, whether the Protected Data has ever been transformed into another data type, the name of the file for the Protected Data, the last user to access the Protected Data, whether the Protected Data has been modified, the number of times the Protected Data has been modified, the location of the Protected Data on the agent. It will be appreciated that the Protection Module may also be configured to perform challenge authentication by querying or prompting on a display coupled to the agent accessing the Protected Data to input further authorization information, such as, for example, user name, password, authentication token with an associated pin, a digital certificate, and the like.

With respect to automated authentication, the Protection Module may further access an internal database of signatures of authorized agents, or interface and utilize one or more third-party authentication methods such as, for example, TPM remote attestation, or operating system authentication, such as, for example, Windows Logon Authentication. It will be appreciated that the Protection Module can also utilize the designated agent by comparing the agent signature to those signatures of authorized agents stored on the designated agent. Alternatively, the Protection Module can transmit the agent signature to the designated agent for comparison by the licensing or authorization agent and the Protection Module may receive authorization back from the designated agent to enable access to the Protected Data by the agent. In addition, it will be appreciated that the Protection Module can also be configured to enforce the scope of access such as, for example, the time of day the Protected Data may be accessed (e.g., during only working hours of 9 am-5 pm Eastern Standard Time), may only be accessed a specific number of times within a set period, whether the Protected Data can be transformed into another data type or printed on paper.

In one non-limiting exemplary implementation, if the Protection Module determines the agent accessing the Protected Data is an authorized agent, then the Protection Module can decrypt, unobfuscate, or otherwise render accessible the Protected Data by the authorized agent. Optionally, if the Protection module determines the agent accessing the Protected Data is an unauthorized agent, the Protection Module can encrypt, obfuscate, delete, or otherwise render inaccessible the Protected Data by the unauthorized agent and/or any subsequent agents attempting to access the Protected Data. Optionally, before encrypting (if not already encrypted), obfuscating (if not already obfuscated), deleting, or otherwise render inaccessible the Protected Data by the unauthorized agent, the Protection Module may also present challenge authentication. It will be appreciated that both automated authentication and challenge authentication can be used to provide further security against unauthorized access of Protected Data. If the user accessing the Protected Data cannot be authenticated on a set number of tries, the Protection Module may encrypt (if not already encrypted), obfuscate (if not already obfuscated), delete, or otherwise render inaccessible the Protected Data by the authorized agent. The Protection Module may also take no action with respect to the Protected Data if the Protected Data has already been encrypted and/or obfuscated. It will be appreciated that if the Protection Module determines whether the agent exceeds the scope of the access for a specific number of times. The Protection Module may also optionally render the Protected Data inaccessible, permanently or temporarily, to the previously authorized agent.

In another non-limiting exemplary implementation, if the Protection Module determines the agent accessing the Protected Data is an unauthorized agent, then the Protection Module can be further configured to contact a designated agent, such as, for example, the licensing and/or authentication agent, and transmit the identification data to designated agent, such that the owner of the Protected Data, the agent operated by the owner, and/or the entity in lawful possession or control of Protected Data can be notified of the unauthorized access by an unauthorized agent. It will also be appreciated that regardless of whether the Protected Data remains accessible or inaccessible to any agent each time the Protected Data is accessed, the Protection Module may store, save, and/or update the identification data stored at a hidden location on an agent, with the Protected Data, or on a licensed or authorized agent, such that a evidentiary trail can be created for enabling and/or enhancing the prosecution relating to the theft of confidential Information and/or Trade Secrets contained in the Protected Data.

Optionally, it will be appreciated that the before blocking, interrupting, throttling, and/or alerting any agents, or performing/executing any type of passive protection, the ARPPS 120 may attempt to determine the source of the attack or unauthorized access. If the source is found in a trusted agent's database, then the ARPPS 120 may ignore the detected attack or unauthorized access. The ARPPS 120 may also be configured to allow user input and removal of the trusted agents from the trusted agent's database such as, for example, customer and/or partner agents. However, it will be appreciated that despite the source being trusted, the detected attack and/or unauthorized access may still store any messages and/or data associated with the detected attack and/or unauthorized access.

With continuing reference to FIG. 2A, in another non-limiting exemplary implementation, once ARPPS 120 detects a spoofed DDoS attack, the ARPPS 120 can select an appropriate type of passive protection from the passive protection database, and execute an appropriate type of passive protection or counter measure, which may impose a throttling policy on messages received from non-existent sources. Moreover, the ARPPS 120 can be further configured to determine or detect messages from non-existent sources by using, for example, reverse path validation methods further discussed with respect to FIG. 6. ARPPS 120 can also be configured to capture the messages.

In addition, the ARPPS 120 can also be configured to drop the messages received from non-existent sources or send these messages to a null interface (sink holing) in order to prevent the messages from reaching the Protected Agents 220-224 for a specified period of time. In addition, after the ARPPS 120 detects a SYN flood attack, the ARPPS 120 may select an appropriate type of passive protection which, in this case, may include sending one or more messages to the one or more Protected Agents 220-224 to free computing resources on the one or more Protected Agents 220-224. ARPPS 120, based on the captured messages, can be configured to determine whether the messages were legitimate attempts to establish a connection with the Protected Agent 220 or the messages were sent in connection with a SYN flood attack. If ARPPS 120 determines that the messages were sent in connection with a SYN flood attack, then the ARPPS 120 may be configured to select an appropriate type of passive protection which, in this case, may include sending one or more Reset (RST) messages to the Protected Agent 220-224 to reset any connections.

To determine whether the captured messages were part of a flood attack, ARPPS 120 can be configured with reverse path validation methods to determine whether the sources are valid. Alternatively, ARPPS 120 can also be configured to determine whether the sources are valid by waiting a specified period of time to receive the corresponding response message from the source. If the ARPPS 120 receives no messages from the source within a specified period of time, then the captured messages are invalid and the messages are determined to be in connection with a flood attack.

Figure 2B:
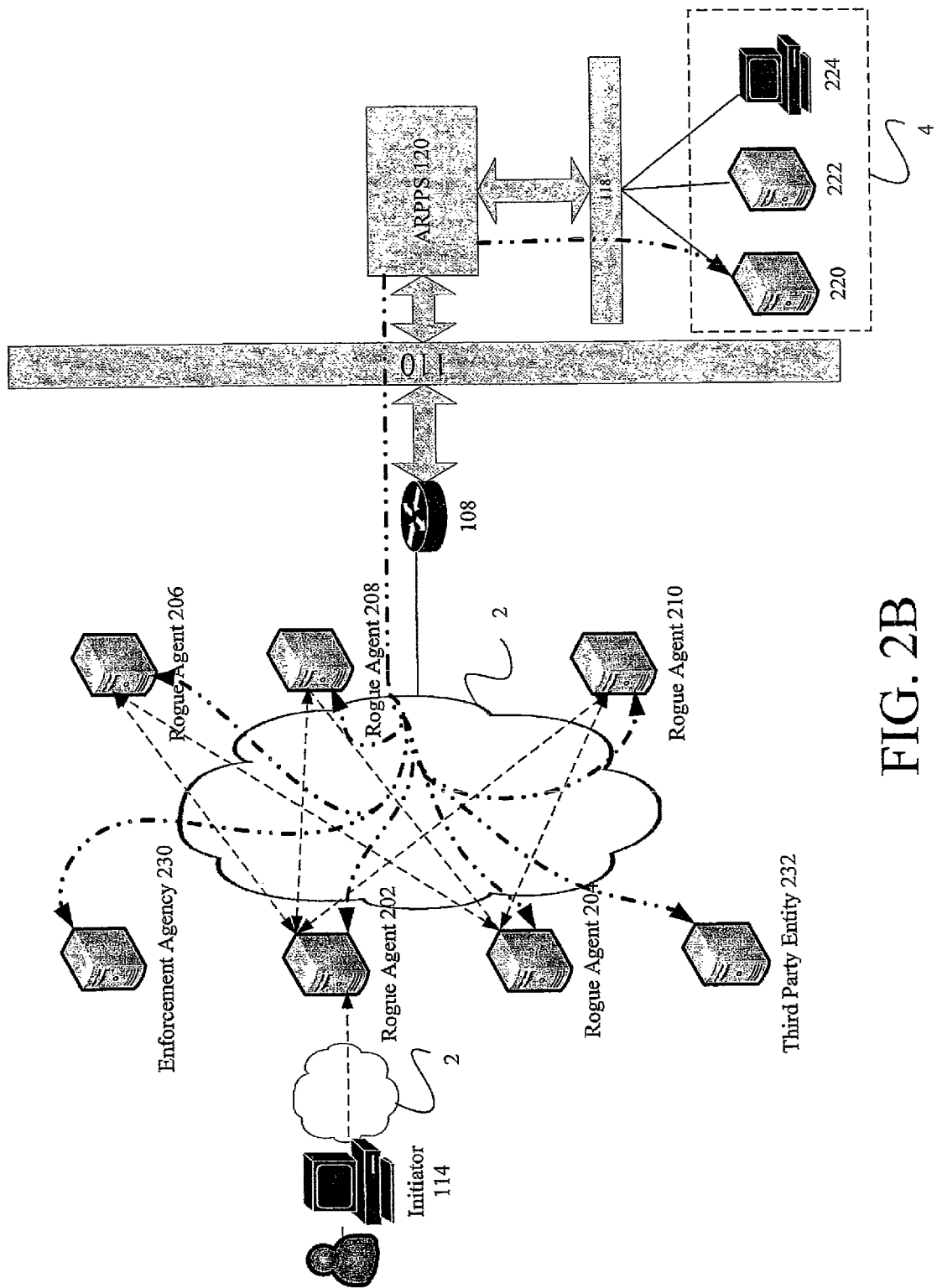
FIG. 2B illustrates an exemplary embodiment of the active and/or passive remediation system responding against a cyber attack.

In FIG. 2B, instead of using passive protection or countermeasures, the ARPPS 120 may also use active remediation and countermeasures against Rogue Agents 202-210 or Automated Agents (not shown). In one non-limiting implementation, upon detecting a SYN flood attack, the ARPPS 120 can be configured to initiate an Internet Protocol (IP) Traceback method to determine the source of the attack. For example, the ARPPS 120 may be communicatively coupled to the upstream provider and can be configured to provide data relating to the captured messages in connection with the flood attack. Moreover, the provided data may include, but is not limited to information stored in data fields such as an IP header, TCP header, and/or contents or hash of the content of data fields to facilitate in the IP Traceback. The IP Traceback methods may include, but not limited to hop-by-hop traceback, input debugging, and backscatter traceback. Alternatively, other techniques can be used such as, the use of iTrace messages encapsulated in an ICMP message sent by routers to the protected Agents 220-226 may enable the ARPPS 120 to determine the source or a range of possible sources of the flood attack without the assistance from one or more upstream Providers.

Once the source or a range of sources is determined, ARPPS 120 can be configured to store and save the source or range of sources in a source database. The source or range of sources may be identified by their network address, such as, for example, their IP address, Media Access Control (MAC) address, and/or Network Service Access Point (NSAP) address, or any other unique identifier assigned to a resource to identify and/or locate the resource across one or more networks. It can be appreciated that in some instances, the at least one identified source may be in possession and/or control of the entity deploying the ARPPS 120 because the identified source is located at a remote location, at the same location, and/or on the same network as the entity deploying the ARPPS 120. Accordingly, the ARPPS 120 can be configured to determine whether such identified sources are in possession and/or control of the entity and store an internal status flag with the respective identified source in the source database to indicate that the respective identified source is in possession and/or control of the entity utilizing the ARPPS 120.

In the non-limiting exemplary embodiment of FIG. 2B, the ARPPS 120 may identify the sources as Rogue Agents 202-210 and determine the responsible entity for an identified source. To determine the responsible entity for the identified source, ARPPS 120 can be configured to retrieve the responsible entity's contact information such as the entity's name, an email address to report abuse, the address of the responsible entity and/or any other information identifying the entity by using the WHOIS protocol or any protocol, standard, and/or Application Programming Interface (API) for retrieving identity information of a resource. Once the contact information has been retrieved, the ARPPS 120 can extract the contact information by tokenizing and/or parsing the retrieved contact information based on fields such as, for example, email, phone number, address, name, and the like. Moreover, the ARPPS 120 can be configured to tokenize or parse the extracted contact information by using, for example, regular expressions. Additionally, if the contact information is in a language other than English, ARPPS 120 can be configured to detect the language of the contact information and translate at least a portion of the contact information identifying the fields before tokenizing or parsing the translated extracted contact information. ARPPS 120 can be configured to detect and translate non-English languages into English by using a Language Translation Module (not shown) or interfacing with an existing API (not shown) such as, for example Google Translate API. Once the contact information is tokenized and/or parsed, ARPPS 120 can then associate the tokenized and/or parsed information with their respective source(s) and store or save the contact information in the source database.

With continuing reference to FIG. 2B, ARPPS 120 can also be configured to at least one identified source, e.g., Rogue Agents 202-210, to determine at least one Rogue Agent's likely operating system and their open and/or closed ports. In one non-limiting exemplary implementation, the ARPPS 120 can be configured to scan for open ports by sending one or more UDP, TCP SYN, and/or Streaming Control Transmission Protocol (SCTP), Initialization (INIT) messages to a list of ports in any specified order on the Rogue Agents 202-210. Additionally, the ARPPS 120 can be configured to receive one or more TCP SYN/ACK, TCP RST, ICMP, SCTP INIT, SCTP Initialization Acknowledgement (INIT-ACK), SCTP ABORT from the Rogue Agents 202-220, and determine one or more open ports on the Rogue Agents 202-210 based at least partially on the message sent to and received from the Rogue Agents 202-210, as well as messages that were sent but ignored by Rogue Agents 202-210.

With continuing reference to FIG. 2B, the ARPPS 120 can be configured to analyze and determine the likely operating system, and services, installed on a particular operating system of the scanned source, by sending specialized messages in a particular sequence with a particular interval between each message sent to known open and/or closed ports of one or more Rogue Agents 202-210. The ARPPS 120 can be configured to receive and capture the messages sent from Rogue Agents 202-210 in response to the specialized messages and derive a system fingerprint for at least one of the Rogue Agents 202-220. The ARPPS 120 can be further configured to a compare system fingerprint of Rogue Agents 202-210 to a system fingerprints database that contains a list of known operating systems and each operating system in the system fingerprints database that may be associated with one or more system fingerprints. Based on the comparison, the ARPPS 120 can determine the likely operating system of the identified source(s) such as, for example, Rogue Agents 202-210 based at least partially on the header of the received messages. After determining the likely operating system for each of the identified source(s), the ARPPS 120 can associate the determined operating system type with the appropriate identified source(s) and store the operating system type in the source database.

Additionally, ARPPS 120 can also be configured to determine the likely type(s) of malware or virus infection(s) based on malware fingerprints, which may include, but is not limited to open and/or closed ports, the captured messages in connection with the attack and/or unauthorized access, and the operating system type of the identified source previously stored in the source database. Thus, the ARPPS 120 can compare the malware fingerprint of an identified source such as, for example Rogue Agent 202 to a malware fingerprints database that contains a list of known types of malware, and each type of malware may be associated with one or more malware fingerprints. Based on the comparison, the ARPPS 120 can determine the type(s) of infection(s) or the infection type(s) for at least one identified source (e.g., Rogue Agent 202). After the infection type(s) are determined, the ARPPS 120 can associate the likely infection type(s) with the appropriate identified source(s), e.g., Rogue Agents 202-210, and store the appropriate type(s) of infection(s) for the at least one identified source in the source database. The ARPPS 120 can also use the infection type for at least one identified source to further determine a remediation module for at least one identified source, e.g., Rogue Agents 202-210, by comparing the type of infection with a remediation database that contains a list of the types of remediation modules, and each type of remediation module may be associated with one or more infection types of the remediation module capable of remediating or removing from one or more identified sources. Once the type of remediation module or remediation module type is determined, the ARPPS 120 can associate the remediation module type with the appropriate identified source and store the remediation module type in the source database.

Alternatively, the ARPPS 120 can also use the infection type for at least one identified source to further determine preventative instructions for at least one identified source, e.g., Rogue Agents 202-210, by comparing the infection type for an identified source to a list of infection types in a prevention database where each infection type may be associated with one or more preventative instructions. Once the appropriate preventative instructions for an identified source is determined, the ARPPS 120 can associate the preventative instruction with the appropriate identified source and store the preventative instruction in the source database.

In order to notify various entities regarding the attack or unauthorized access performed by identified sources, e.g., Rogue Agents 202-210, the ARPPS 120 can be configured to automatically create one or more notification messages for transmission to the various entities. In addition to warning the message recipient regarding the attack or unauthorized access on one or more protected agents, e.g., Protected Agents 220-226, the ARPPS 120 can also incorporate into the notification message, the network address of at least one identified source, the type of infection, the contact information of the at least one identified source, the type of remediation module for the at least one identified source and/or a Universal Resource Identifier (URI) associated with the appropriate remediation module. Thus, the ARPPS 120 can retrieve from the source database the previously stored or saved identified source(s) and their associated information such as, for example, network address associated with the identified source(s), e.g., Rogue Agents 202-210, the contact information, the type of infection, the type of remediation module, and/or a URI associated with the appropriate remediation module. Additionally, the ARPPS 120 can retrieve and incorporate previously stored or saved messages in connection with an attack or unauthorized access. The ARPPS 120 can also be configured to incorporate reconnaissance data received from a reconnaissance payload into the one or more notification messages sent to the various entities. The reconnaissance data is any data gathered by the reconnaissance payload relating to an identified source which may include, but is not limited to, the type operating system, internal and/or external network address, the current running processes, daemons, and/or services, the shared objects or dynamic libraries loaded by each executable process, the opened ports associated with each process and their destination address. The reconnaissance data may also include, but is not limited to, software identifiers for each of the installed software on the identified source, version number(s) of the software installed, operating system type, hardware identifiers such as Media Access Control (MAC) address for any network interfaces, storage volume/drive serial numbers, processor serial numbers, Trusted Platform Module (TPM) remote attestation hash-key, personal identifiers, such as, for example, the current user logged into the agent, and the like. Further, the ARPPS 120 can also incorporate into the notification message contact information or URI to offer live assistance in the identification and removal of the malware or virus infection to persons in possession and/or control of at least one identified source.

In one non-limiting embodiment, the ARPPS 120 can be configured to retrieve the contact information of the identified source(s), such as, for example Rogue Agents 202-210 from the source database and send notification messages in an email, via a mail server (not shown) coupled to the ARPPS 120, to the email address associated with an identified source. Accordingly, in the context of a notification message sent to entities identified in the contact information associated with an identified source (e.g., Rogue Agent 202), the ARPPS 120 can incorporate into the previously identified remediation module type to further customize the notification message sent to the identified source by providing a remediation module that is tailored for the infection type and operating system type of the identified source. Additionally, the ARPPS 120 can also incorporate into the notification message the previously identified preventative instructions for the identified source.

With continued reference to FIG. 2B, ARPPS 120 may also send notification messages to Enforcement Agency 230, such as, for example, law enforcement agencies or Third Party Entity 232, such as, for example, the entity identified in possession and/or control of one or more Rogue Agents and/or Automated Agents regarding the attack or unauthorized access. Thus, the ARPPS 120 can retrieve the infection type from the source database to further customize the notification message sent to the law enforcement and provide a remediation module tailored for the particular operating system and malware or virus on the identified source (e.g., Rogue Agents 202-210). Moreover, the remediation module may also be sent to the Enforcement Agency 230 or Third Party Entity 232 via a file attachment, or URI identifying a location to obtain the remediation module for the particular operating system and malware or virus on the identified source. ARPPS 120 can also geo-locate local Enforcement Agency 230 or Third Party Entity 232 and their respective contact information near at least one identified source by communicating with geo-location services via one or more interfaces to determine the nearby Enforcement Agency 230 or Third Party Entity 232 around the identified source within a specified radius, such as, for example, a local FBI office. The ARPPS 120 may also retrieve the local Enforcement Agency 230 or Third Party Entity 232 for the contact information, including an email address, a physical address, and/or telephone address by interfacing with a Geo-location Module (not shown), or one or more APIs such as Google Maps API. Thus, the ARPPS 120 can send a notification message via email to a local FBI office, where the notification message may include contact information of the identified source, the information identifying the source, infection type on the identified source, preventative instructions, and captured messages in connection with attack or unauthorized access.

With continued reference to FIG. 2B, ARPPS 120 may also send, provide, and/or transmit one or more payloads back to at least one identified source (e.g., Rogue Agent 202-210). These payloads may include, but are not limited to, a reconnaissance payload, notification payload, and/or a remediation payload. To send one or more payloads to the at least one identified source, ARPPS 120 can be configured to identify one or more vulnerabilities present on the at least one identified source that would allow remote execution of executable instructions. Moreover, to identify one or more vulnerabilities, ARPPS 120 can scan the identified source for one or more remote execution vulnerabilities stored in a vulnerabilities database, associate the one or more remote execution vulnerabilities with an appropriate identified source, and store the one or more remote execution vulnerabilities in the source database. It can be appreciated that the ARPPS 120 can be configured to interface with one or more APIs and/or command line interfaces provided by third party scanning software such as, for example, Nmap, Nessus, and the like to scan and identify one or more vulnerabilities.

ARPPS 120 can select at least one of the identified remote execution vulnerabilities that may enable remote execution of executable instructions on the identified source and execute the selected remote execution vulnerability to exploit the identified vulnerability. Moreover, the ARPPS 120 can be configured to exploit the identified vulnerability by, for example, sending one or more malformed messages to one or more ports on an identified source to cause a buffer overflow of a service, daemon, and/or process executing on the identified source. This, in turn, may allow remote injection of executable instructions that would enable a remote command and control and/or file transfer interface. After the remote execution vulnerability is exploited, ARPPS 120 or the identified source may establish a connection between ARPPS 120 and the identified source using the remote command and control interface and/or file transfer interface of the identified source by ARPPS 120. ARPPS 120 can transmit one or more payloads to the identified source through the remote command and control interface and/or file transfer interface, and remotely execute one or more transferred payloads. Optionally, it can be appreciated that for purposes of legal compliance across various jurisdictions, the ARPPS 120, before scanning the identified source for vulnerabilities or before selecting at least one vulnerability to exploit on identified sources (e.g., Rogue Agents 202-210), may determine whether such identified sources are in possession and/or control of the entity using the ARPPS 120 by retrieving the internal status flag previously stored in the source database. Moreover, if the internal status flag indicates that an identified source is in possession and/or control of the entity using the ARPPS 120, then ARPPS 120 can scan the identified source and/or exploit vulnerability on the identified source. It can be appreciated that the ARPPS 120 may also interface with one or more APIs and/or command line interfaces such as, for example, those provided by Metasploit and/or Core Impact to exploit one or more identified vulnerabilities on the identified source, transmit one or more payloads to the identified source, and execute the one or more payloads.

ARPPS 120 can also send a reconnaissance payload to the at least one identified source (e.g., Rogue Agent 202-210) to further determine the operating environment of the at least one identified source. The ARPPS 120 and/or the reconnaissance payload can analyze the reconnaissance data and determine which offending process, daemon, and/or service is attacking the protected agents. In order to reinforce the identification of the identified source behind the attack or unauthorized access using services, the ARPPS 120 and/or the reconnaissance payload can determine the offending process, daemon, or service on the identified source. Once identified, the reconnaissance payload can be configured to modify the network data sent by the offending process, daemon, and/or service, determined on the identified source. Moreover, the network data may be modified with a hidden encrypted marker before its transmission, such that only the system may decrypt the marker upon receipt of the modified network data.

A remedial payload can be sent to the at least one identified source (e.g., Rogue Agents 202-208). The remediation payload may include the previously identified remediation module for a particular identified source such as, for example, an anti-virus program or a malicious program removal tool, to remove malware or the virus that was identified by port scans conducted by ARPPS 120 and/or recognizance data gathered by the recognizance payload on the identified source. Using network analyzers, the identified operating system, open ports, daemons, processes, services, malware, or virus are used to further customize the remedial payload transmitted to the identified source. Once a remedial payload is sent to the identified source by ARPPS 120, ARPPS 120 can remove one or more identified malwares or viruses using the previously exploited remote command and control interface or file transfer interface on the identified source. If the identified malware or virus cannot be removed, the remedial payload may determine the offending process, daemon, or service on the identified source and modify the network data sent by the offending process, daemon, or service. Network data can be modified such that all data transmitted by the offending process, daemon, or service with its destination or source set for protected agents, will be redirected to a null interface or a non-existent address.

ARPPS 120 may also send a notification payload that notifies the immediate person or entity in possession or control of the identified source with a notification message regarding the attack, the unauthorized access, and the appropriate prevention methods. The notification message in the context of a notification payload may contain information summarizing the malware or virus and request the immediate person or entity in possession and/or control of the identified source to remove the malware and/or virus.

Figure 3:
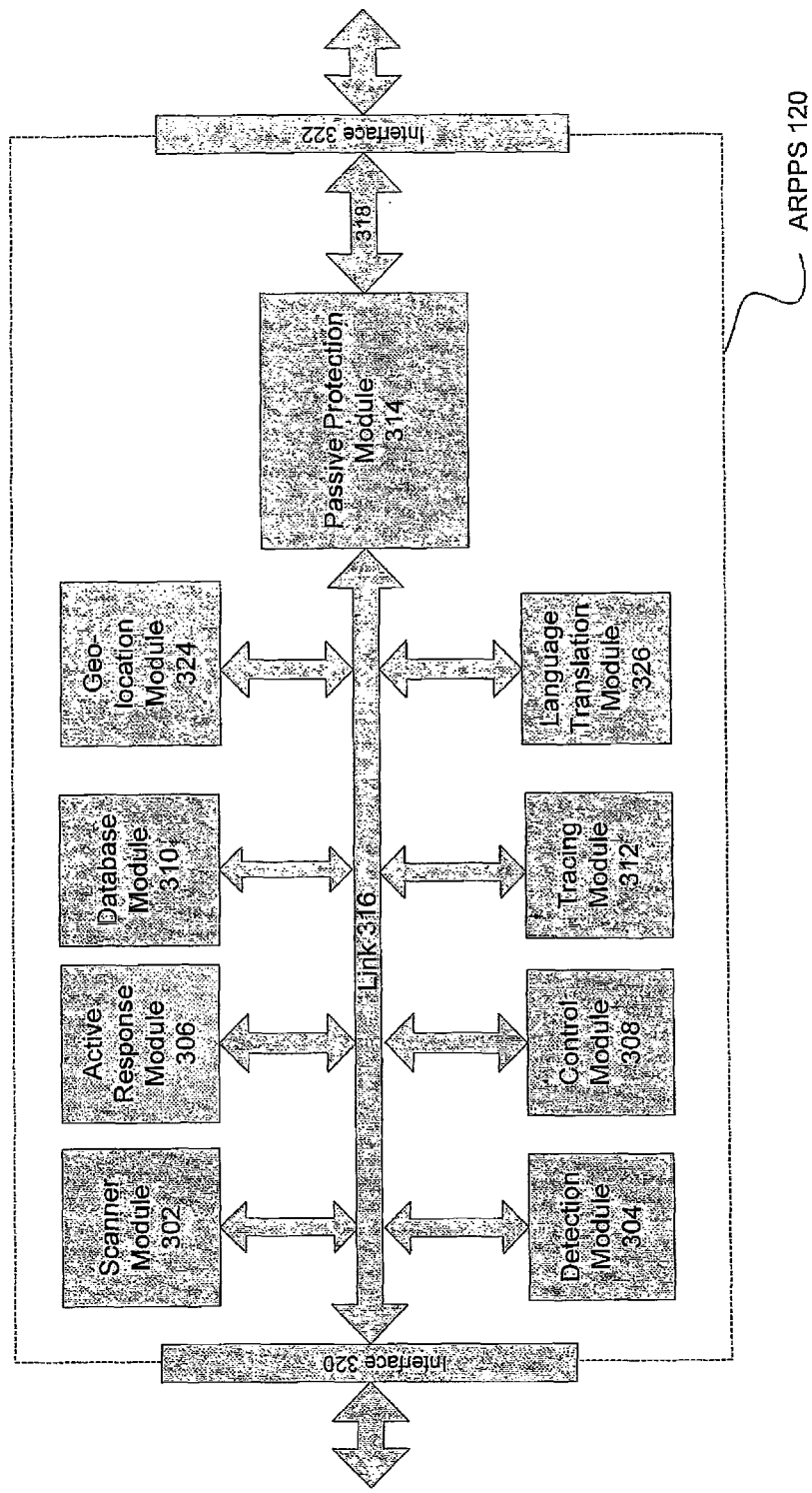
FIG. 3 illustrates an exemplary embodiment of the active and/or passive remediation system.

FIG. 3 illustrates a non-limiting exemplary embodiment of the ARPPS 120 system which may be implemented by a one or more of modules. The modules may comprise, or be implemented as, one or more systems, sub-systems, processors, devices, machines, tools, components, circuits, registers, applications, programs, subroutines, or any combination thereof, as desired for a given set of design or performance constraints. In various embodiments, the modules may be connected by one or more communications media. Communications media generally may comprise any medium capable of carrying information signals. For example, communication media may comprise wired communication media, wireless communication media, or a combination of both, as desired for a given implementation. The embodiments are not limited in this context.

In particular, the ARPPS 120 may include, but is not limited to, a Scanner Module 302, an Active Response Module 306, a Database Module 310, a Geo-location Module 324, a Detection Module 304, a Control Module 308, a Tracing Module 312, a Language Translation Module 326, and a Passive Protection Module 314. All modules may be communicatively coupled between and among each other via the link 316. Additionally, the ARPPS 120 may interface with the upstream Provider, network devices, network resources, and/or agents via the interface 320 and link 316, and interface with downstream network devices and/or agents via link 318 and interface 322. Moreover, it can be appreciated that link 316 and/or 318 may be communication links implemented in software via one or more procedural calls and/or hardware such as network devices or interfaces, backplane bus, midplane bus, and the like. The Scanner Module 302 can be configured to scan one or more agents to determine open and/or closed ports, one or more vulnerabilities and interface with the Database Module 310 to store the results in one or more databases. The Detection Module 304 can be configured to detect one or more attacks and/or unauthorized access, capture any messages in connection with the attack and/or unauthorized access, and interface with the Database Module 310 to store the results in one or more databases. The Active Response Module 306 can be configured to send one or more notification messages and one or more payloads to one or more agents identified. The Control Module 308 can be configured to create one or more notification messages, provide one or more interfaces, including user interfaces or programming interfaces, and control one or more modules to facilitate in detecting, actively responding, and/or passively protecting against attacks and/or unauthorized access. Additionally, the Control Module 308 can be configured to interface with the Database Module 310 to retrieve identified sources and their associated information. The Tracing Module 312 can be configured to trace an attack or unauthorized access or interface with upstream network devices, network resources, and/or agents to initiate a trace, an attack or unauthorized access. Once the sources have been identified, the Tracing Module 312 can determine the contact information for the identified sources and store the identified sources and their associated contact information in one or more databases by interfacing with the Database Module 310. The Language Translation Module 326 can be configured to interface with and translate any information or data obtained from any of the modules in the ARPPS 120, such as, for example, contact information in non-English language retrieved by the Tracing Module 312. The Geo-location Module 324 can be configured to interface with any of the modules in the ARPPS 120 such as, for example, the Control Module, to geo-locate a nearest local law enforcement agency and/or third party entity in the vicinity of one or more identified sources and interface with the Database Module 310 to store information associated with local a law enforcement agency and/or a third party entity in one or more databases. The one or more databases may include, but is not limited to, source database, system fingerprints database, passive protection database, trusted agents database, attack database, malware fingerprints database, prevention database, remediation database, and/or vulnerabilities database. The Passive Protection Module 314 can be configured to block or throttle one or more attacks and/or unauthorized access and send one or more messages to downstream network devices, network resources, and/or agents such as, for example, one or more protected agents to protect and mitigate against attacks and/or unauthorized access. Finally, the Database Module 310 can be configured to interface with any module in the ARPPS 120 to store information sent from any of the modules in the ARPPS 120. Additionally, the Database Module 120 may also be configured to send the previously stored information to any of the modules in response to requests by the respective modules in the ARPPS 120.

Figure 4:
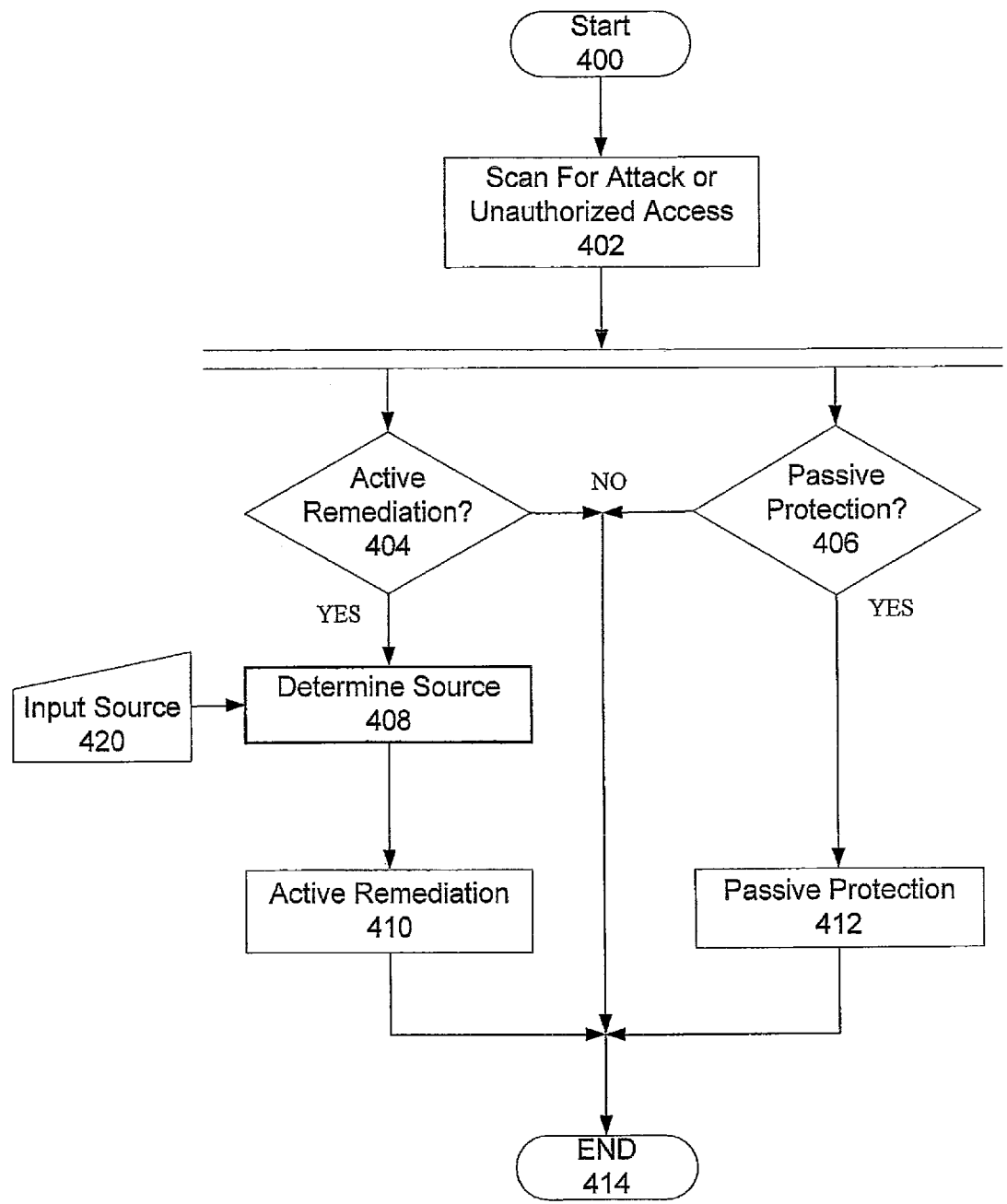
FIG. 4 illustrates an exemplary embodiment of a logic flow of the active and/or passive remediation system.

FIG. 4 illustrates a non-limiting exemplary logic flow of the ARPPS 120 system for actively remediating and passively protecting against attacks and/or unauthorized access. Moreover, the exemplary logic flow in FIG. 4 may be implemented in the Control Module 308 of the ARPPS 120 and the Control Module 308 can be configured to interface with any of the modules in the ARPPS 120 to perform or execute the exemplary logic flow of FIG. 4. Initially, ARPPS 120 can scan for attacks or unauthorized access ("Scan for Attack or Unauthorized Access" 402). Once an attack or unauthorized access is detected, the ARPPS 120 can be configured to determine whether active remediation is selected ("Active Remediation?" 404), or passive protection is selected ("Passive Protection?" 406). If Passive Protection is selected, the ARPPS 120 can be configured to execute one or more passive protection mechanisms and/or passive countermeasures ("Passive Protection" 412), such as for example, blocking or throttling one or more attacks and/or unauthorized access. If Active Remediation is selected, then the ARPPS 120 can be configured to determine the sources of attack or unauthorized access ("Determine Source" 408). Alternatively, ARPPS 120 can also be configured to receive a specified source or range of sources from, for example, user input ("Input Source" 420). Once the sources are determined, the ARPPS 120 can be configured to execute or perform one or more active remediation mechanisms, such as, for example, sending one or more notification messages, identifying one or more vulnerabilities of the identified sources, and/or payloads to one or more identified sources ("Active Remediation" 410). It can be appreciated that the steps 404, 408, and 410 can be executed or performed by the ARPPS 120 substantially in parallel with steps 406 and 412. Alternatively, the steps 404, 408, and 410, can be executed or performed by the ARPPS 120 in series either before or after steps 406 and 412, or may be executed or performed in any combinations thereof.

Figure 5:
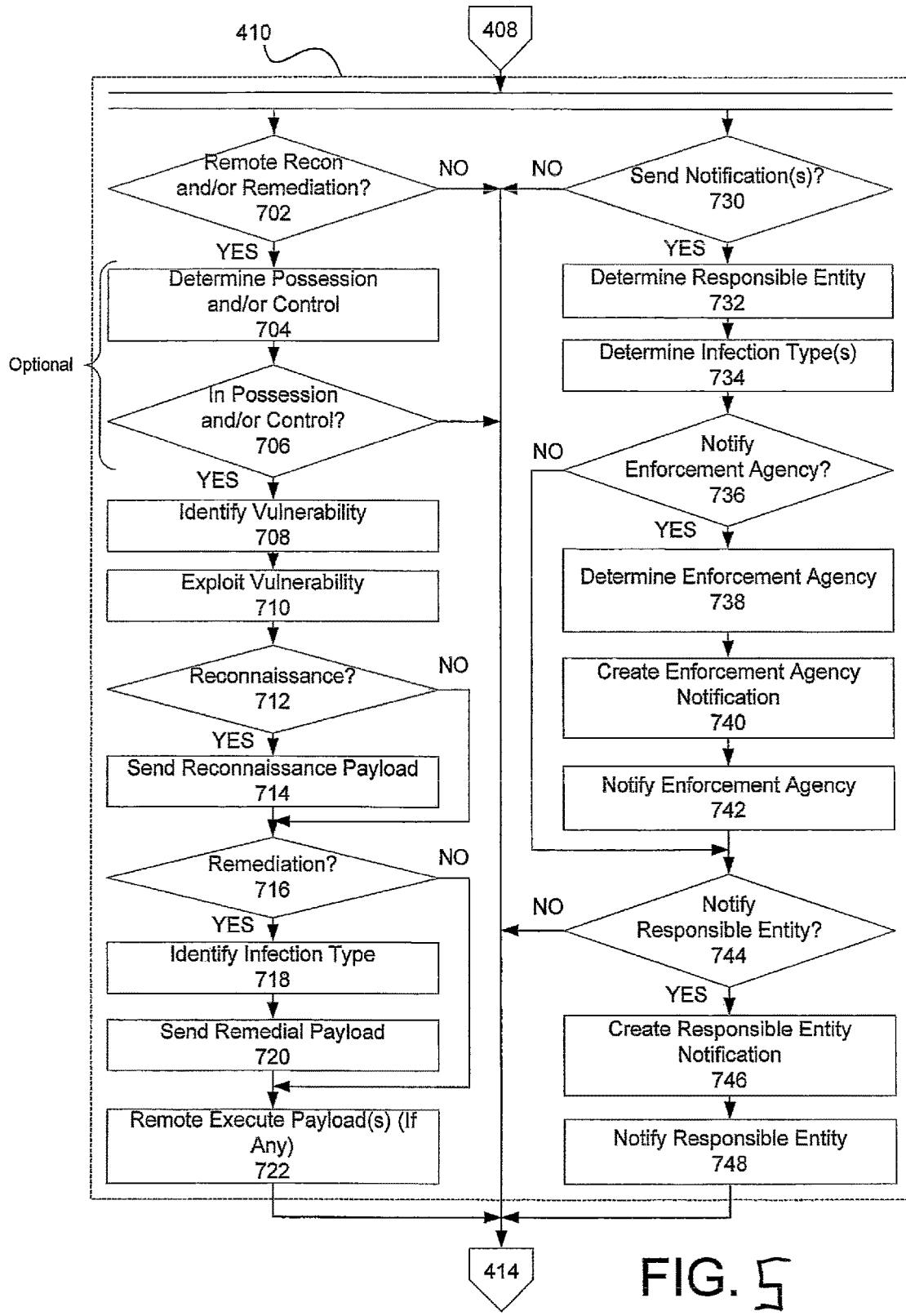
FIG. 5 illustrates an exemplary embodiment of a logic flow for actively remediating against attacks or unauthorized access by the Active Response Module.

FIG. 5 illustrates an exemplary embodiment of a logic flow for actively remediating against attacks or unauthorized access by the Active Response Module. Once the sources of the attacks or unauthorized access are determined, the ARPPS 120 can be configured to execute or perform one or more active remediation mechanisms, such as, for example, sending one or more notification messages, identifying one or more vulnerabilities of the identified sources, and/or payloads to one or more identified sources ("Active Remediation" 410). As part of the active remediation of step 410 (FIG. 4), the ARPPS 120 determines in step 702 (FIG. 5) whether to perform remote reconnaissance and/or remediation. The ARPPS 120 determines in step 730 whether to send one or more notifications. If remote reconnaissance and/or remediation is determined to be performed in step 702, possession and/or control may determined in step 704. If possession and/or control is determined in step 704, one or more vulnerabilities of the source is identified in step 708 and the vulnerabilities are exploited in step 710. In step 712, whether to perform reconnaissance is determined. If reconnaissance is determined to be performed in step 712, a reconnaissance payload is sent to the source in step 714. In step 716, whether to perform remediation is determined. If remediation is determined to be performed in step 716, an infection type is identified in step 719 and a remedial payload is sent to the source of the infection in step 720. Remote execution of the payload, if any, is performed in step 722. If one or more notifications are determined to be sent in step 730, a responsible entity is determined in step 732 and an infection type is determined in step 734. In step 736, whether to notify an enforcement agency is determined. If it is determined in step 736 to notify an enforcement agency, an enforcement agency is determined in step 738, a notification is created in step 740, and the enforcement agency is notified in step 742. In step 744, whether to notify a responsible entity is determined. If it is determined in step 742 to notify a responsible entity, a responsible entity notification is created in step 746 and a responsible entity is notified in step 748. The processing in the left side of FIG. 5, e.g., steps 702 through 722, may be performed parallel to or serially before or after the steps in the right side of FIG. 5, e.g., steps 730 through 748.

Figure 6:
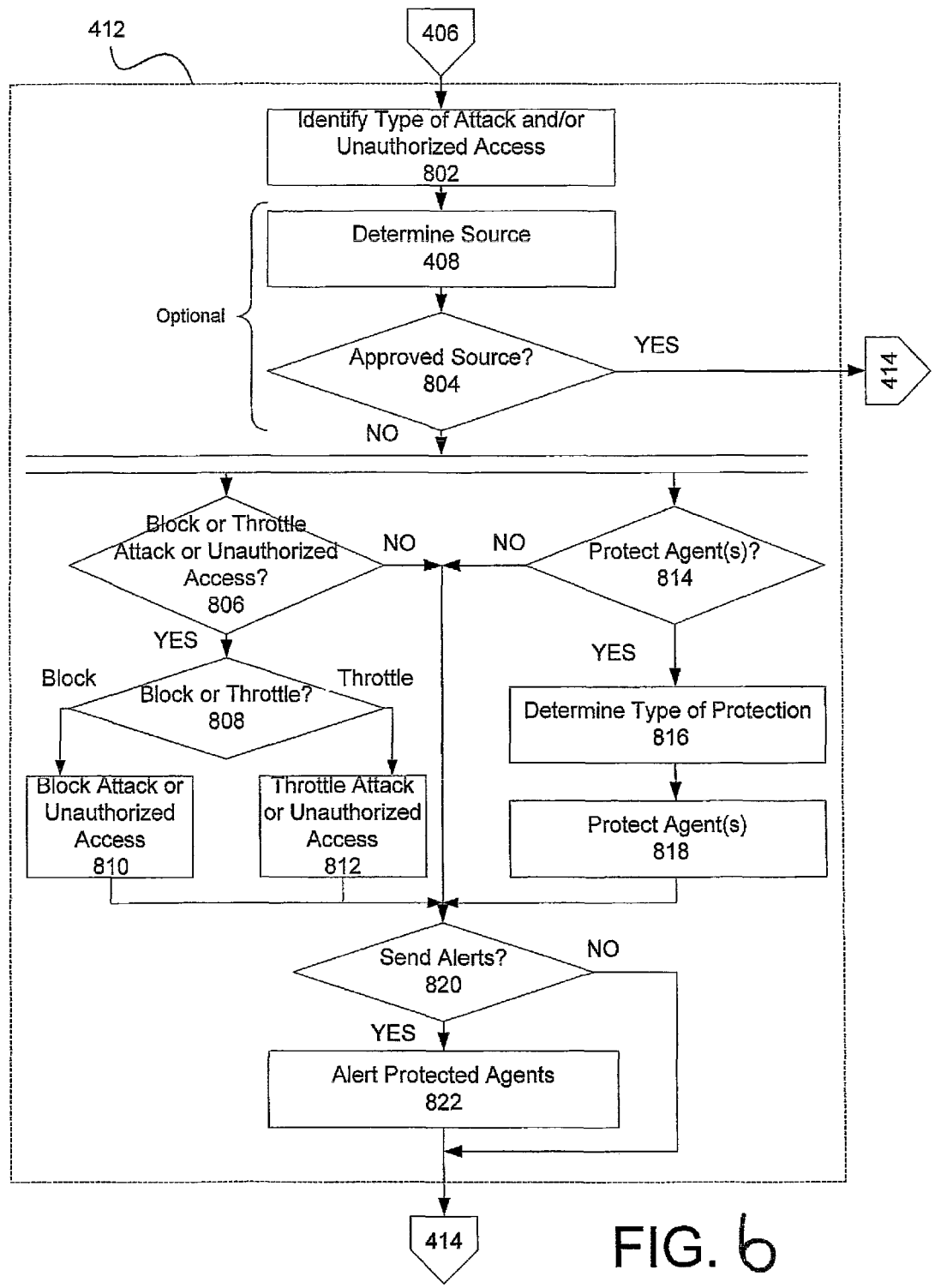
FIG. 6 illustrates an exemplary embodiment of a logic flow for passively protecting against attacks or unauthorized access by the Passive Protection Module.

FIG. 6 illustrates an exemplary embodiment of a logic flow for passively protecting against attacks or unauthorized access by the Passive Protection Module. If Passive Protection is selected, the ARPPS 120 can be configured to execute one or more passive protection mechanisms and/or passive countermeasures ("Passive Protection" 412), such as for example, blocking or throttling one or more attacks and/or unauthorized access. As part of the passive protection of step 412, the ARPPS 120 identifies the type of attack and/or unauthorized access in step 802. The ARPPS 120 may determine the source of the attack and/or unauthorized access in step 408 and determine if the source is an approved source in step 804. If the source is determined to be an approved source in step 804, processing may end. If the source is determined to not be an approved source in step 801, processing proceeds to steps 806 and 814. In step 806, it is determined whether any blocking or throttling of the attack or unauthorized access is to be performed. If the attack or unauthorized access is determined to be blocked or throttled in step 806, it is determined in step 808 whether to block the attack or unauthorized access in step 810 or throttle the attack or unauthorized access in step 812. After blocking or throttling the attack or unauthorized access in step 810 or 812, it is determined whether to send alerts in step 820. If, however, in step 806, it is determined that no blocking or throttling of the attack is to be performed, processing may proceed directly to step 820. In step 814, it is determined whether to protect one or more agents. If the one or more agents are determined in step 814 to be protected, a type of protection is determined in step 816, and the one or more agents are protected in step 818. If no agents are determined in step 814 to be protected, processing may proceed directly to step 820. The processing in the left side of FIG. 6, e.g., steps 806 through 812, may be performed parallel to or serially before or after the steps in the right side of FIG. 6, e.g., steps 814-818. If in step 820 it is determined that alerts are to be sent, protected agents are altered in step 822. If in step 820 it is determined that no alerts are to be sent, processing may end.

Unless specifically stated otherwise, it may be appreciated that terms such as "processing," "computing," "calculating," "determining," "providing," "updating" or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers, or other such information storage, transmission, or display devices.

The system can be implemented as a hardware element, a software element executed by a computer, a firmware element embedded in hardware, or any combination thereof. In various embodiments, the logic flow may comprise, or be implemented as, executable computer program instructions. The executable computer program instructions may be implemented by software, firmware, a module, an application, a program, a widget, a subroutine, instructions, an instruction set, computing code, words, values, symbols, or combination thereof. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The executable computer program instructions may be implemented using any suitable high-level, low-level, object-oriented, visual, compiled, and/or interpreted programming language in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, causes the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Additionally, the article and/or computer-readable storage medium may be of the non-transitory type. Examples of computer-readable storage media may include, but are not limited to, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Figure 7:
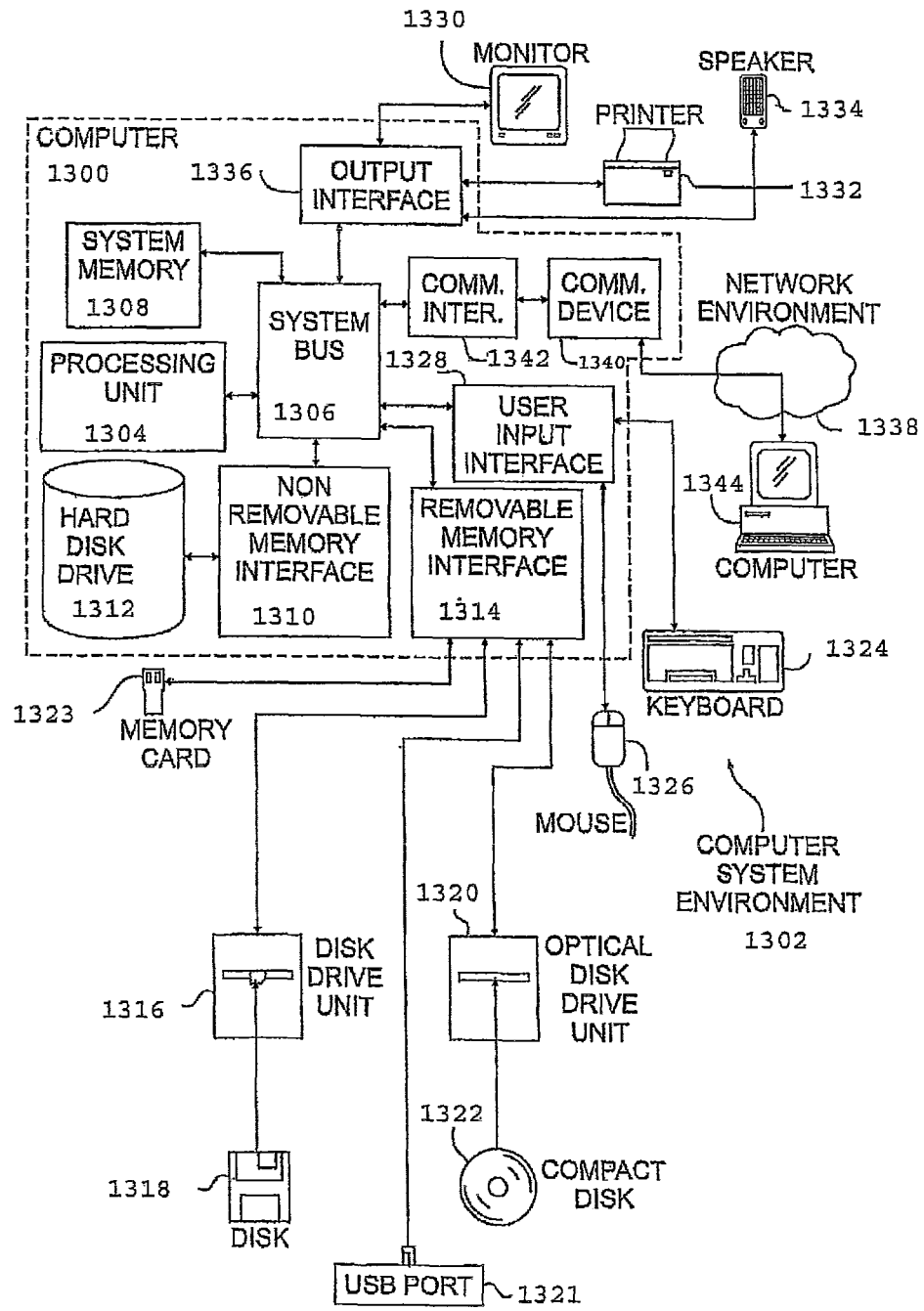
FIG. 7 illustrates an exemplary computing system that can implement the active and/or passive remediation system.

In various embodiments, the present invention or portions of the present invention, for example, ARPPS 120 may be implemented on a variety of computing devices and systems, wherein these computing devices include the appropriate processing mechanisms and the article and/or the computer-readable storage medium for storing and executing computer-readable instructions, such as programming instructions, code, and the like. As shown in FIG. 7, personal computers 1300, 1344, in a computing system environment 1302 are provided. This computing system environment 1302 may include, but is not limited to, at least one computer 1300 having certain components for appropriate operation, execution of code, and creation and communication of data. For example, the computer 1300 includes a processing unit 1304 (typically referred to as a central processing unit or CPU) that serves to execute computer-based instructions received in the appropriate data form and format. Further, this processing unit 1304 may be in the form of multiple processors executing code in series, in parallel, or in any other manner for appropriate implementation of the computer-based instructions.

In order to facilitate an appropriate data communication and processing information between the various components of the computer 1300, a system bus 1306 is utilized. The system bus 1306 may be any of several types of bus structures, including a memory bus or memory controller, a peripheral bus, or a local bus using any of a variety of bus architectures. In particular, the system bus 1306 facilitates data and information communication between the various components (whether internal or external to the computer 1300) through a variety of interfaces, as discussed hereinafter.

The computer 1300 may include a variety of discrete computer-readable media components. For example, this computer-readable media may include any media that can be accessed by the computer 1300, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electronically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 1300. Further, this computer-readable storage medium may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer 1300 may further include a system memory 1308 with computer storage media in the form of volatile and non-volatile memory, such as ROM and RAM. A basic input/output system (BIOS) with appropriate computer-based routines, assists in transferring information between components within the computer 1300 and is normally stored in ROM. The RAM portion of the system memory 1308 typically contains data and program modules that are immediately accessible to, or presently being operated on, by processing unit 1304, e.g., an operating system, application programming interfaces, application programs, program modules, program data and other instruction-based computer-readable codes.

With continued reference to FIG. 7, the computer 1300 may also include other removable or non-removable, volatile or non-volatile computer storage media products. For example, the computer 1300 may include a non-removable memory interface 1310 that communicates with and controls a hard disk drive 1312, i.e., a non-removable, non-volatile magnetic medium; and a removable, non-volatile memory interface 1314 that communicates with and controls a magnetic disk drive unit 1316 (which reads from and writes to a removable, non-volatile magnetic disk 1318), an optical disk drive unit 1320 (which reads from and writes to a removable, non-volatile optical disk 1322, such as a CD ROM), a Universal Serial Bus (USB) port 1321 for use in connection with a removable memory card, etc. However, it is envisioned that other removable or non-removable, volatile or non-volatile computer storage media can be used in the exemplary computing system environment 1300, including, but is not limited to, magnetic tape cassettes, DVDs, digital video tape, solid state RAM, solid state ROM, etc. These various removable or non-removable, volatile or non-volatile magnetic media are in communication with the processing unit 1304 and other components of the computer 1300 via the system bus 1306. The drives and their associated computer storage media discussed above and illustrated in FIG. 7, provide storage of operating systems, computer-readable instructions, application programs, data structures, program modules, program data, and other instruction-based computer-readable code for the computer 1300 (whether duplicative or not of this information and data in the system memory 1308).

A user may enter commands, information, and data into the computer 1300 through certain attachable or operable input devices, such as a keyboard 1324, a mouse 1326, etc., via a user input interface 1328. Of course, a variety of such input devices may be utilized, e.g., a microphone, a trackball, a joystick, a touchpad, a touch-screen, a scanner, etc., including any arrangement that facilitates the input of data, and information into the computer 1300 from an outside source. As discussed, these and other input devices are often connected to the processing unit 1304 through the user input interface 1328 coupled to the system bus 1306, but may be connected by other interface and bus structures, such as a parallel port, game port, or a USB. Still further, data and information can be presented or provided to a user in an intelligible form or format through certain output devices, such as a monitor 1330 (to visually display this information and data in electronic form), a printer 1332 (to physically display this information and data in print form), a speaker 1334 (to audibly present this information and data in audible form), etc. All of these devices are in communication with the computer 1300 through an output interface 1336 coupled to the system bus 1306. It is envisioned that any such peripheral output devices be used to provide information and data to the user.

The computer 1300 may operate in a network environment 1338 through the use of a communications device 1340, which is integral to the computer or remote therefrom. This communications device 1340 is operable by and in communication to the other components of the computer 1300 through a communications interface 1342. Using such an arrangement, the computer 1300 may connect with or otherwise communicate with one or more remote computers, such as a remote computer 1344, which may be a personal computer, a server, a router, a network personal computer, a peer device, or other common network nodes, and typically includes many or all of the components described above in connection with the computer 1300. Using appropriate communication devices 1340, e.g., a modem, a network interface or adapter, etc., the computer 1300 may operate within and in communication through a local area network (LAN) and a wide area network (WAN), but may also include other networks such as a virtual private network (VPN), an office network, an enterprise network, an Intranet, the Internet, etc. It will be appreciated that the network connections shown are exemplary and other means of establishing a communications link between the computers 1300, 1344 may be used.

As used herein, the computer 1300 includes or is operable to execute appropriate custom-designed or conventional software to perform and implement the processing steps of the method and system of the present invention, thereby forming a specialized and particular computing system. Accordingly, the presently-invented method and system may include one or more computers 1300 or similar computing devices having a computer-readable storage medium capable of storing computer-readable program code or instructions that cause the processing unit 1302 to execute, configure, or otherwise implement the methods, processes, and transformational data manipulations discussed hereinafter in connection with the present invention. Still further, the computer 1300 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Computer 1344 represents one or more work stations appearing outside the local network which may include one or more user computers providing one or more user environments. The one or more users interact with computer 1300, which can be an exchange system of logically integrated components including a database server and a web server. In addition, secure exchange of information or data can take place through the Internet using the secure World Wide Web. An e-mail server can reside on system computer 1300 or a component thereof. Electronic data interchanges can be transacted through networks connecting computer 1300 and computer 1344.

While certain features of the embodiments have been illustrated as described above, many modifications, substitutions, changes, and equivalents will now occur to those skilled in the art. It is, therefore, to be understood that the appended claims are intended to cover all such modifications and changes as fall within the true spirit of the embodiments.

What is claimed is:

1. A method for active remediation and/or passive protection against cyberattacks, the method comprising: monitoring at least a portion of network data between at least one first network and at least one second network to detect one or more attacks and/or unauthorized access to at least one first agent in the at least one first network by at least one initiating agent in the at least one second network;

initiating a traceback to an identified source of the attack for generating a range of possible rogue agents compromised by unauthorized accesses and used by the identified source for the attack in the second network and sending a message to the range of possible rogue agents comprising notification to rogue agent administrators that their computer is being used in an attack; and sending a response to the identified source of the attack, wherein requested data is replaced with protected data comprising a protection module embedded within non-confidential data, which is executed when the protected data is accessed to create an evidentiary trail for legal prosecution of the unauthorized access.

2. The method of claim 1, further comprising: determining at least one source of the one or more attacks and/or unauthorized access.

3. The method of claim 2, further comprising: determining at least one of an operating system, open and/or closed ports, and a type of malware or virus infection of the at least one source of the one or more attacks and/or unauthorized access.

4. The method of claim 1, wherein an active remediation response further comprises at least one of providing one or more payloads to the identified source to remove malware or virus infections or exploit one or more vulnerabilities on the identified source of the one or more attacks and/or unauthorized access and sending one or more notification messages including information associated with the one or more attacks and/or unauthorized access to one or more enforcement agencies.

5. The method of claim 1, wherein the one or more passive protections comprise at least one of throttling the one or more attacks and/or unauthorized access, interrupting the one or more attacks and/or unauthorized access, performing or executing a passive protection counter measure to protect the at least one first agent, and sending one or more messages including information associated with the one or more attacks and/or unauthorized access to the at least one first agent.

6. The method of claim 1, further comprising: selecting, by the active remediation and passive protection server computer, the one or more passive protections and the active remediation response from a plurality of different passive protections and a plurality of different active remediation responses, and based on a type of the one or more detected attacks and/or unauthorized access.

7. A system for active remediation and/or passive protection against cyber attacks, the system comprising:
an active remediation and passive protection server computer between at least one first network and at least one second network, wherein the active remediation and passive protection server computer is configured to:
monitor at least a portion of network data between the at least one first network and the at least one second network to detect one or more attacks and/or unauthorized access to at least one first agent in the at least one first network by at least one initiating agent in the at least one second network; and
execute (i) an active remediation response to actively respond to the one or more detected attacks and/or unauthorized access by initiating a traceback to an identified source of the attack to generate a range of possible rogue agents compromised by unauthorized accesses and used by the identified source for the attack in the second network and sending a message to the range of possible rogue agents comprising notification to rogue agent administrators that their computer is being used in an attack, and (ii) one or more passive protections to passively protect against the one or more detected attacks and/or unauthorized access, wherein passive protections include replacing requested data with protected data comprising a protection module embedded within new non-confidential data, which is executed when the protected data is accessed to create an evidentiary trail for legal prosecution of the unauthorized access.

8. A non-transitory computer readable medium storing a computer program which when executed by a processor of a computer is capable of performing a method for active remediation and/or passive protection against cyber attacks, the method comprising:
monitoring at least a portion of network data between at least one first network and at least one second network to detect one or more attacks and/or unauthorized access to at least one first agent in the at least one first network by at least one initiating agent in the at least one second network; and
(generating a traceback to an identified source of the attack and generating a range of possible rogue agents compromised by unauthorized accesses and used by the identified source for the attack in the second network and sending a message to the range of possible rogue agents comprising notification to rogue agent administrators that their computer is being used in an attack; and sending a response to the identified source of the attack, wherein requested data is replaced with protected data comprising a protection module embedded within new non-confidential data, which is executed when the protected data is accessed to create an evidentiary trail for legal prosecution of the unauthorized access.

9. The method for active remediation and/or passive protection against cyber attacks of claim 1, further comprising sending a reconnaissance payload to the identified source to gather reconnaissance data relating to the identified source.

10. The method for active remediation and/or passive protection against cyber attacks of claim 1, further comprising when an associated application accesses the protected data, the protection module is executed.

11. The method for active remediation and/or passive protection against cyber attacks of claim 1, further comprising replacing the requested data with alternate data.

12. The method for active remediation and/or passive protection against cyber attacks of claim 1, wherein the protection module renders inaccessible the protected data if the protection module determines an unauthorized agent attempts to access the protected data.

13. The system for active remediation and/or passive protection of claim 7, further comprising a reconnaissance payload.

14. The system for active remediation and/or passive protection of claim 7, further comprising a protection payload embedded in the protection module wherein, when an associated application accesses the protected data, the protection module is executed.

15. The system for active remediation and/or passive protection of claim 14, further comprising a protection payload wherein the protection module renders inaccessible the protected data if the protection module determines an unauthorized agent attempts to access the protected data.

* * * * *

UNITED STATES PATENT AND TRADEMARK OFFICE
CERTIFICATE OF CORRECTION

PATENT NO. : 9,648,029 B2  
APPLICATION NO. : 13/953790  
DATED : May 9, 2017  
INVENTOR(S) : Lee C. Cheng Page 1 of 1

It is certified that error appears in the above-identified patent and that said Letters Patent is hereby corrected as shown below:

In the Claims

Column 24, Line 60, Claim 1, delete "cyberattacks," and insert -- cyber attacks, --

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*